US012678944B2

(12) United States Patent
Lou et al.

(10) Patent No.: US 12,678,944 B2
(45) Date of Patent: Jul. 14, 2026

(54) PRECISION ASSEMBLY CONTROL METHOD AND SYSTEM BY ROBOT WITH VISUAL-TACTILE FUSION

(71) Applicant: Harbin Institute of Technology, Shenzhen, Shenzhen (CN)

(72) Inventors: Yunjiang Lou, Shenzhen (CN); Ruikai Liu, Shenzhen (CN); Xiansheng Yang, Shenzhen (CN); Ajian Li, Shenzhen (CN)

(73) Assignee: Harbin Institute of Technology, Shenzhen, Shenzhen (CN)

( * ) Notice: Subject to any disclaimer, the term of this patent is extended or adjusted under 35 U.S.C. 154(b) by 0 days.

(21) Appl. No.: 18/709,157

(22) PCT Filed: Oct. 31, 2022

(86) PCT No.: PCT/CN2022/128555
§ 371 (c)(1),
(2) Date: May 10, 2024

(87) PCT Pub. No.: WO2023/083034
PCT Pub. Date: May 19, 2023

(65) Prior Publication Data
US 2025/0353167 A1    Nov. 20, 2025

(30) Foreign Application Priority Data

Nov. 12, 2021    (CN) .......................... 202111336206.8
Nov. 12, 2021    (CN) .......................... 202111336234.X
Nov. 12, 2021    (CN) .......................... 202111336249.6

(51) Int. Cl.
B25J 9/16          (2006.01)
B25J 13/08         (2006.01)
B25J 19/02         (2006.01)

(52) U.S. Cl.
CPC ............. B25J 9/163 (2013.01); B25J 9/1697 (2013.01); B25J 13/084 (2013.01); B25J 19/023 (2013.01)

(58) Field of Classification Search
None
See application file for complete search history.

(56) References Cited

U.S. PATENT DOCUMENTS

2021/0125052 A1*    4/2021    Tremblay ................. B25J 9/161
2021/0270605 A1*    9/2021    Patel .......................... G06T 7/40
(Continued)

FOREIGN PATENT DOCUMENTS

CN        2010017768 A        7/2010
CN        109940605 A        6/2019
(Continued)

OTHER PUBLICATIONS

English Language translation of CN-120587153-A (Year: 2025).*
(Continued)

*Primary Examiner* — Ryan Rink
(74) *Attorney, Agent, or Firm* — Rhodes IP PLC

(57) ABSTRACT

A robot-based assembly control method includes providing a plurality of neural network models comprising at least a reinforcement learning network model and a tensor fusion network model. Training data for the models includes visual data from the vision device, tactile data from the tactile sensor, motion feedback data from the robot and torque feedback data from the robot. An assembly control system based on the robot, which includes a clamping effector at an end of a movable part of the robot, wherein a tactile sensor and a soft rubber pad are provided on an inside clamping portion of the clamping effector from inside to outside is described. Based on fusing the visual information with the external forces of other dimensions indirectly obtained from (Continued)

changes in tactile signals, representation vectors can be used to generate appropriate instructions of robot motion for flexibly adjusting the insertion force to complete the assembly.

5 Claims, 5 Drawing Sheets

(56)　　　　　　References Cited

U.S. PATENT DOCUMENTS

| | | | | |
|---|---|---|---|---|
| 2022/0314434 | A1 * | 10/2022 | Kranski | B25J 9/163 |
| 2022/0318678 | A1 * | 10/2022 | Kranski | G06N 20/00 |
| 2023/0234232 | A1 * | 7/2023 | Hayashi | B25J 13/084 |
| | | | | 700/253 |
| 2023/0330859 | A1 * | 10/2023 | Tee | G01L 1/18 |

FOREIGN PATENT DOCUMENTS

| | | | | |
|---|---|---|---|---|
| CN | 111444954 | A | | 7/2020 |
| CN | 112388655 | A | | 2/2021 |
| CN | 112631128 | A | | 4/2021 |
| CN | 113172629 | A | | 7/2021 |
| CN | 113878588 | A | | 1/2022 |
| CN | 113927602 | A | | 1/2022 |
| CN | 113954076 | A | | 1/2022 |
| CN | 120587153 | A | * | 9/2025 |

OTHER PUBLICATIONS

I Ajian, Liu, Ruikai等 "Reinforcement Learning Strategy Based on Multimodal Representations for High-Precision Assembly Tasks", 《Intelligent Robotics and Application》 Oct. 19, 2019.

* cited by examiner

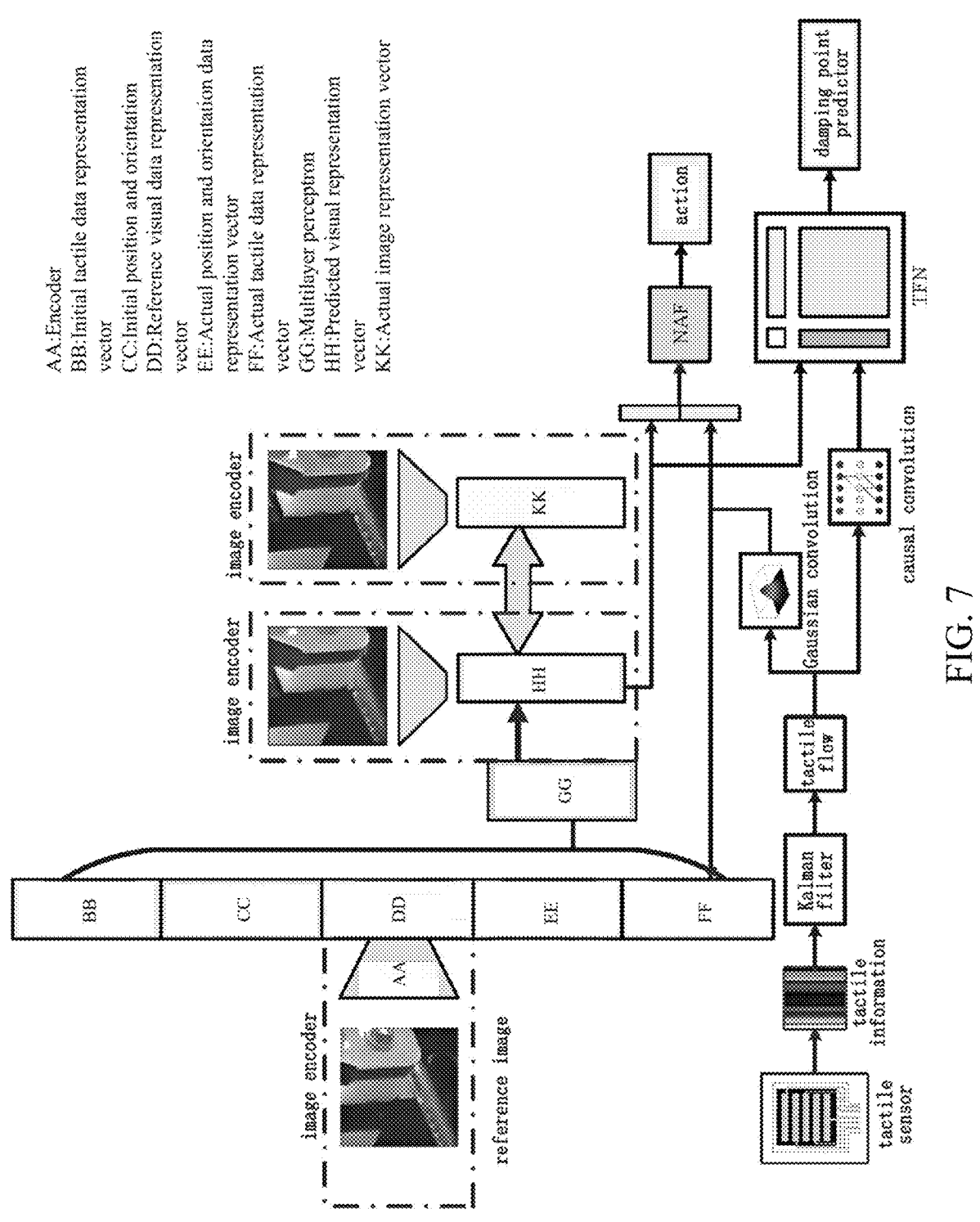

AA:Encoder
BB:Initial tactile data representation vector
CC:Initial position and orientation
DD:Reference visual data representation vector
EE:Actual position and orientation data representation vector
FF:Actual tactile data representation vector
GG:Multilayer perceptron
HH:Predicted visual representation vector
KK:Actual image representation vector

FIG. 7

PRECISION ASSEMBLY CONTROL METHOD AND SYSTEM BY ROBOT WITH VISUAL-TACTILE FUSION

TECHNICAL FIELD

The present disclosure relates generally to robot-based assembly control methods and systems, and in particular to robotic precision assembly control methods and systems based on fusion of vision and tactile sense. The present disclosure belongs to the field of robotics.

BACKGROUND

In the batch production line of consumer electronic products, although most of the assembly tasks that do not require high precision have been fully automated by industrial robots, there are still many precision assembly and smooth assembly tasks that need to be done manually by workers. The research on industrial robots to realize assembly tasks with high precision, high speed, high flexibility, and high success rate has been receiving much attention and facing great technical challenges. Moreover, a vision device of industrial robots is easily affected by the environment during precision assembly, for example, the precision assembly steps cannot be finished due to the vision device being blocked or defocused by the clamping effector.

SUMMARY

In the present disclosure robot-based assembly control methods and systems are provided in order to solve at least one of the technical problems in the prior art.

On the basis of the technical solution of the disclosure, the robot is provided with a tactile sensor on an end effector for gripping, wherein the assembly area of the end effector is photographed by a vision device.

In an aspect, a technical solution of the disclosure relates to an assembly control method based on the robot, which includes the following steps of:

S110, providing a plurality of neural network models including at least a reinforcement learning network model and a tensor fusion network model, wherein training data for the models includes visual data from the vision device, tactile data from the tactile sensor, motion feedback data from the robot and torque feedback data from the robot;

S120, driving the clamping effector by a robot controller to launch an assembly action from an initial point of assembly, and acquiring visual data and tactile data corresponding to the assembly area in real time by the vision device and the tactile sensor, and compressing the data and/or processing the data by a filter, and converting the data to a visual data representation vector and a tactile data representation vector, respectively;

S130, splicing and fusing the visual data representation vector and the tactile data representation vector, and inputting the vectors to the reinforcement learning network model for outputting predicted motion control data of the robot;

S140, inputting the visual data representation vector and the tactile data representation vector to the tensor fusion network model, and determining whether the clamping effector is moved to an assembly damping point by means of a damping point predictor having a multilayer perceptron; and S150, implementing a position control and a force control by the robot controller according to the predicted motion control data of the robot and the prediction of whether or not the clamping effector is moved to the assembly damping point, to calculate position and orientation data of the next assembly motion point and to adjust an assembly force of the clamping effector;

wherein the visual data includes RGB image data and depth image data.

In another aspect, a technical solution of the disclosure relates to an assembly control method based on a robot for a cross-modal predicted assembly scenario, wherein a tactile sensor is provided on a clamping effector at an end of the robot, wherein an assembly area of the clamping effector is photographed by a vision device, and wherein the method includes the following steps of:

S210, providing a plurality of neural network models including a multilayer perceptron, a reinforcement learning network model and a tensor fusion network model, wherein the training data for the models includes visual data from the vision device, tactile data from the tactile sensor, position and orientation data from a robot controller, motion feedback data from the robot and torque feedback data from the robot;

S220, driving the clamping effector by the robot controller to launch an assembly action from an initial point of assembly, and acquiring reference visual data, actual visual data, initial tactile data and actual tactile data corresponding to the assembly area in real time by means of the vision device and the tactile sensor, providing initial position and orientation data and the actual position and orientation data by the robot controller, compressing the data and/or processing the data by a filter, and converting the data to reference visual data representation vector, actual visual representation vector, actual tactile data representation vector, initial tactile data representation vector and actual position and orientation data representation vector, respectively;

S230, splicing and fusing the reference visual data representation vector, the initial tactile data representation vector, the actual tactile data representation vector, the initial position and orientation data representation vector and the actual position and orientation data representation vector, and inputting the vectors to the multilayer perceptron for output a predicted visual representation vector that is close to an actual visual representation vector;

S240, splicing and fusing the predicted visual representation vector and the actual tactile data representation vector, and inputting the vectors to the reinforcement learning network model for outputting predicted motion control data of the robot;

S250, descending dimensions of the tactile data representation vector and assembly force data of the robot by causal convolution, inputting the descended tactile data representation vector, the descended assembly force data and the predicted visual representation vector to the tensor fusion network model, and determining whether the clamping effector reaches an assembly damping point by a multi-layer perceptron including a damping point predictor; and S260, implementing a position control and a force control by the robot controller according to the prediction of whether or not the clamping effector reaches the assembly damping point, to calculate the position and orientation data of the next assembly motion point and to adjust an assembly force of the clamping effector.

The technical solution of the disclosure also relates to a computer readable storage medium, storing program instructions executed by a processor for implementing the above method.

The technical solution of the disclosure also relates to an assembly control system based on a robot, including: a clamping effector at an end of a movable part of the robot, wherein a tactile sensor and a soft rubber pad are provided on an inside clamping portion of the clamping effector from inside to outside; a vision device matched with the robot, the vision device for acquiring visual data of an assembly part and surroundings; and a computer device including the computer readable storage medium.

The beneficial effects of the disclosure are as follows.

1. In the disclosure, changes in tactile signals are utilized to indirectly obtain information about external forces in other dimensions, so that a multimodal representation can be obtained by fusing the information with visual information. The vector of the representation can be used to generate appropriate robot action commands, and also used to predict whether the assembly parts reach the damping point, so as to flexibly adjust the insertion force to complete the assembly.

2. In the disclosure, a plurality of neural network models are utilized to integrate the visual and haptic data in the assembly operation with the effect of reinforcement learning, so as to significantly improve the success rate and accuracy of precision assembly of small parts.

BRIEF DESCRIPTION OF THE DRAWINGS

FIG. 7 is a flow framework diagram of an assembly control method based on predicted scene according to an embodiment of the disclosure.

DETAILED DESCRIPTION

The following will provide a clear and complete description of the concept, specific structure, and technical effects of the disclosure, with the help of embodiments and accompanying drawings, in order to make the purpose, solution, and effects of the disclosure to be fully understood.

It should be noted that, unless otherwise specified, when a feature is referred to as "fixed" or "connected" to another feature, it can be directly or indirectly fixed or connected to the other feature. Moreover, unless otherwise defined, all technical and scientific terms used in this document have the same meaning as commonly understood by those skilled in the art. The terms used in this document are only for describing specific embodiments and should not be construed as limiting the disclosure. The term "and/or" used herein includes any combination of one or more of the listed items.

Figure 3:
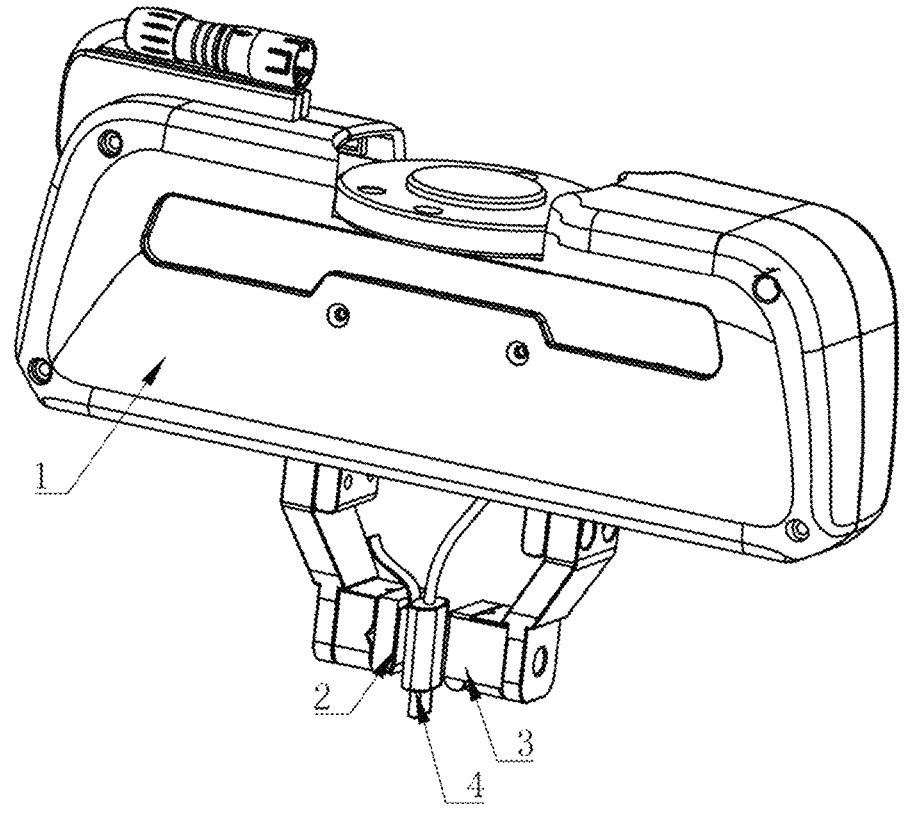
FIG. 3 is a schematic diagram of an arrangement of a clamping effector according to an embodiment of the disclosure.
Figure 4:
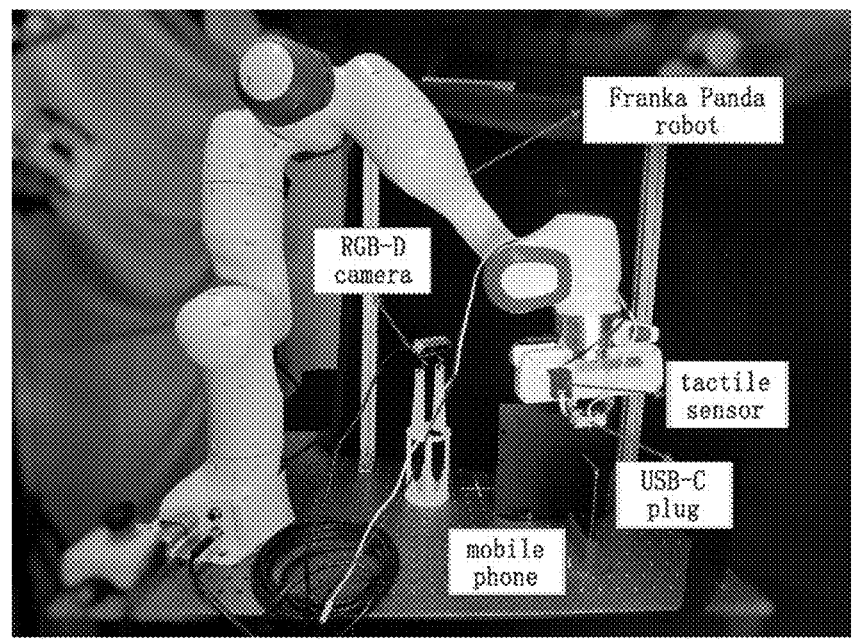
FIG. 4 is a hardware platform with a robot and an assembly control system according to an embodiment of the disclosure.

The technical solution of the disclosure is implemented on the basis of a hardware foundation of a robot, e.g. an existing robot configuring hardware and software. Referring to FIGS. 3 and 4, in some embodiments, an assembly system according to the disclosure includes: a clamping effector 1 at an end of a moving part of the robot; a tactile sensor 2 arranged on an inside clamping portion of the clamping effector 1; a vision device configured to photograph an assembly area of the clamping effector; and a computer device (not showing) communicatively coupled to a robot motion controller, the clamping effector 1, the tactile sensor 2 and the vision device.

Referring to FIG. 3, in an exemplary assembly application example of the disclosure, the assembly system according to the disclosure is capable to be applied to an assembly of plug and jack in a form of snap-fit. In a preferred embodiment, the tactile sensor 2 can be a 5×5 dot matrix pressure-sensitive tactile sensor. In order to achieve a better measurement for a "pre-slip" of a component 4 to be clamped under an external force, a rubber pad made of soft rubber (having about 5 mm thickness) is arranged between a fingertip portion of the clamping effector 1 and one side of the tactile sensor 2, and a rubber film is applied on the other side of the tactile sensor (i.e., on the side in contact with the component 4 to be clamped). Referring to FIG. 4, the vision device can be an RGB-D camera capable of outputting both RGB image data and depth image data. The robot is a multi-joint serial robot which is mounted with the clamping effector 1 at the end. The computer device can be independent of the robot controller or can be integrated into the robot controller, for implementing the method according to the disclosure.

Figure 1:
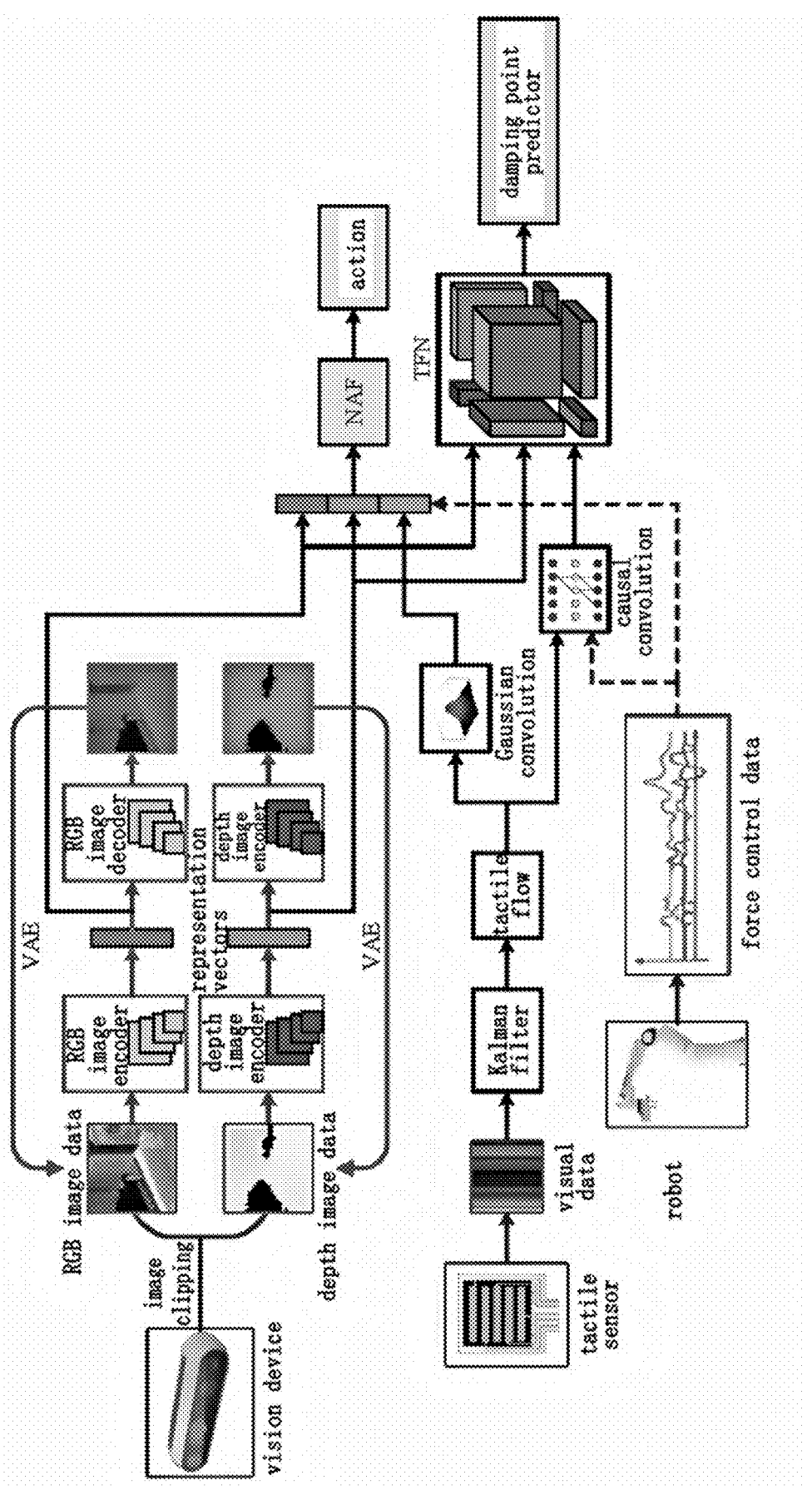
FIG. 1 is an overall flow framework diagram of a method according to an embodiment of the disclosure.
Figure 2:
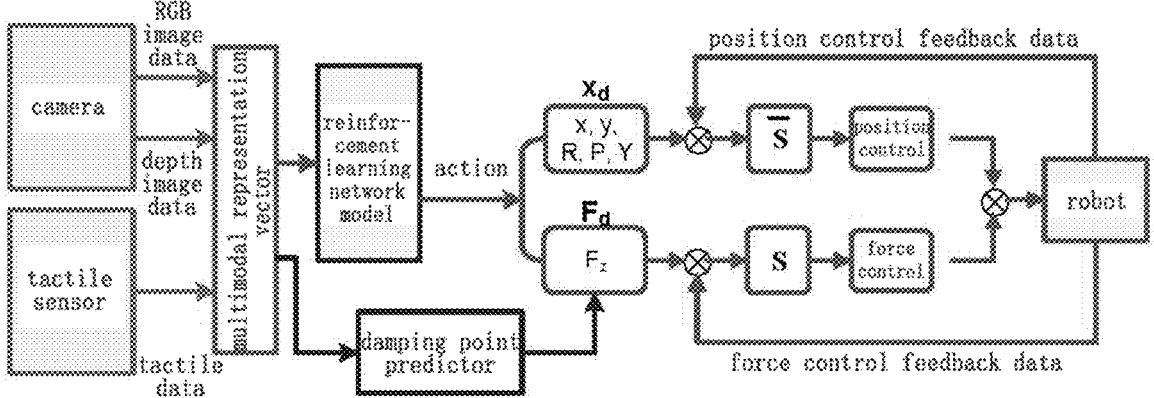
FIG. 2 is a detailed flow block diagram of a robot motion control of a portion of a method according to an embodiment of the disclosure.

Referring to FIGS. 1 and 2, in some embodiments, the method according to the disclosure includes the following steps of:

S110, providing a plurality of neural network models including at least a reinforcement learning network model and a tensor fusion network model, wherein training data for the models includes visual data from the vision device, tactile data from the tactile sensor, position and orientation data from the controller of the robot, motion feedback data from the robot and torque feedback data from the robot;

S120, driving the clamping effector by a robot controller to launch an assembly action from an initial point of assembly, and acquiring visual data and tactile data corresponding to the assembly area in real time by the vision device and the tactile sensor, and compressing the data and/or processing the data by a filter, and converting the data to a visual data representation vector and a tactile data representation vector, respectively;

S130, splicing and fusing the visual data representation vector and the tactile data representation vector, and inputting the vectors to the reinforcement learning network model for outputting predicted motion control data of the robot;

S140, inputting the visual data representation vector and the tactile data representation vector to the tensor fusion network model, and determining whether the clamping effector is moved to an assembly damping point by means of a damping point predictor having a multilayer perceptron; and S150, implementing a position control and a force control by the robot controller according to the predicted motion control data of the robot and the prediction of whether or not the clamping effector is moved to the assembly damping point, to calculate position and orientation data of the next assembly motion point and to adjust an assembly force of the clamping effector; wherein the visual data includes RGB image data and depth image data.

In the following, specific embodiments of the above steps are described in conjunction with specific examples of 3C component assembly. In these examples, the assembly process for inserting a USB-C charging cable plug into a socket lies in that: the clamping effector 2 clamps the USB-C charging cable plug; the USB-C socket is secured; the tactile sensor captures pressure tactile data of the clamping effector 2 clamping the USB-C charging cable plug; and the vision device captures visual data relating to the USB-C charging cable plug (hereinafter referred to as the plug) and the USB-C socket (hereinafter referred to as the socket).

Embodiments of Step S110

The training data includes visual data from a vision device, in the embodiments, i.e. a camera, which captures images of visual data of the plug and the socket, i.e. RGB image data and depth image data presenting both of the plug and the socket. As shown in conjunction with FIG. 1 and FIG. 3, the tactile data is from the tactile sensor being a 5×5 dot matrix pressure-sensitive tactile sensor in the embodiments, so that the pressure tactile data of the clamping effector clamping the plug is acquired.

Step S110 also specifically includes:

acquiring the real-time position and orientation of the end of the robot in six-dimensional Cartesian space and inputting the position and orientation to the reinforcement learning network model for training, and capturing the RGB image data, the depth image data, and the tactile data for each assembly action step in the assembly area, wherein: the real-time Cartesian space position and orientation of the clamping effector at the end of the robot in the embodiment is used as a status input; and the RGB image data and the depth image data presenting both of the plug and the socket, and the pressure tactile data from the clamping of the plug are input to the reinforcement learning network model for training, after these data are acquired at a plurality of action positions; and increasing a reward in a reward function of the reinforcement learning network model accordingly, if the clamping effector is closer to an assembly end point, or if the clamping effector is deeper to an assembly part during inserting, wherein the reward of the reward function of the reinforcement learning network model in the embodiment is increased according to the proximity of the plug to the socket, and the depth of insertion of the plug into the socket.

In step S110, training the reinforcement learning network model in conjunction with the robot platform further includes the following steps of S111 to S115.

At S111, a position control and a force control are implemented by the robot controller based on an assembly force of M Newton in the direction of the assembly damping point of the clamping effector before the clamping effector reaches to the assembly damping point, and a position control and a force control are implemented by the robot controller based on an assembly force of N Newton in the direction of the assembly damping point of the clamping effector after the clamping effector reaches to the assembly damping point, wherein N>M.

At S112, the motion feedback data and torque feedback data are input to the robot controller, and outputting, the motion feedback gain and torque feedback gain are output by the robot controller for calculating the assembly force of the next assembly motion point of the robot.

As shown in FIG. 2, in combination with the above embodiment, a hybrid force/position control method is used to motion control of the robot, i.e., a decoupled motion along the direction of the assembly of the plug and socket (i.e., the perpendicular direction or the z-axis direction as shown in FIGS. 3 and 4) is controlled by force control, and motions of the five degrees of freedom (x, y, R, P, Y) of the robot are controlled by position control. Before the plug reaches the snap damping point, the robot drives the clamping effector along the z-axis with an assembly force of M=2 Newton. After the plug reaches the damping point, the robot drives the clamping effector along the z-axis with an assembly force of N=12 Newton. With regard to the five degrees of the dimension of the position control, the feedback gain of the control system is larger to ensure the accuracy, while for the one degree of the dimension of the force control, the feedback gain of the control system is smaller to ensure the smoothness of the component assembly.

At S113, the visual data and the tactile data are acquired once for each data acquisition point from 50 data acquisition points arranged in each action step from a plurality of action steps, wherein the plurality of action steps are divided from a path between the assembly damping point and a point before the clamping effector reaches the assembly damping point.

At S114, the clamping effector is driven by the robot controller to the assembly initial point for resetting and restarting the assembly action, if the clamping effector runs 50 action steps where the clamping effector does not reaches the assembly damping point.

At S115, an action step is divided into 10 segments and a total of 11 data acquisition points are configured for each action step.

In the above embodiments, for steps S113 to S115, a complete plug-jack experiment of the robot is referred a "round", and each round consists of no more than 50 "action steps". If the robot fails to complete the plug-jack task even after 50 action steps, it is judged to have failed and reset to the initial point. Each action step is divided into 10 segments involving total 11 "waypoints". The robot drives the clamping effector to travel through these waypoints sequentially to complete a motion step. The RGB image data and the depth image data of the plug and the socket are acquired once per motion step; and the tactile data is acquired once per waypoint.

Specifically, processing the RGB image data and the depth image data in each assembly action step of the clamping effector includes:

corresponding to the last waypoint in each assembly action step of the clamping effector, clipping the RGB image data with 128 pixels×128 pixels to a grayscale image, and compressing the grayscale image converted from the corresponding RGB image data to an RGB representation vector by an RGB image encoder;

corresponding to the last waypoint in each assembly action step of the clamping effector, clipping and normalizing the depth image data with 128 pixels×128 pixels, and compressing the normalized depth image data to a depth representation vector by a depth image encoder.

As in FIG. 1, in the above embodiment, the RGB image and the depth image of the plug and socket, which are output by the camera around the assembly area, are clipped to a size of 128 pixels×128 pixels, and the RGB image is converted to a grayscale image, so as to reduce the size and processing time of the data.

Embodiments of Step S120

In one embodiment, the clamping effector carries the plug to a point located approximately 1 mm above the socket, which is taken as the assembly initial point. The robot acquires the six-dimensional Cartesian space position and orientation vector of the clamping effector at the initial point by its own system (e.g., a Robot Operating System, ROS).

Step S120 also specifically includes the following steps of S121 to S123.

At S121, the tactile data is filtered by a Kalman filter, so that the tactile flow data of the robot along the direction of the assembly action is obtained by means of an optical flow algorithm (Farneback algorithm). As shown in FIG. 1, in the embodiment described above, after the acquired tactile information is filtered by the Kalman filter, and, analogous to the optical flow, the tactile flow in the x-axis and y-axis directions of the clamping effector in each action step is calculated by the Farneback algorithm (with a dimension of 25 (5×5 detection points)×2 (both directions of the x-axis and y-axis)×10 (due to every tactile flow information being calculated for every tactile information of every two consecutive waypoints). In addition, the tactile flow data can be reduced by causal convolution with a dimension of 25 tactile detection points×2 tactile detection points to obtain processed tactile data.

At S122, the captured RGB image data is converted to a grayscale image, and for the last waypoint in each assembly action step of the clamping effector, the RGB image data is compressed to an RGB representation vector by an RGB image encoder, and the RGB representation vector is clipped by an RGB image decoder to a processed grayscale image with 128 pixels×128 pixels.

At S123, the captured depth image data is converted to a grayscale image, and for the last waypoint in each assembly action step of the clamping effector, the depth image data is compressed to a depth representation vector by a depth image encoder, and the depth representation vector is clipped by a depth image decoder to a processed depth image with 128 pixels×128 pixels.

As shown in FIG. 1, in steps S122 and S123, in the embodiment described above, the RGB image and the depth image of the plug and socket, which are output by the camera around the assembly area, are clipped to a size of 128 pixels×128 pixels, and the RGB image is converted to a grayscale image, so as to reduce the size and processing time of the data.

At S124, a variational auto encoder is provided, to which the processed grayscale image and the processed depth image are input, for training multiple times respectively, and outputting an RGB representation vector with a dimension of 16×1 and a depth representation vector with a dimension of 16×1 respectively. In the above embodiment, both the grayscale image and the depth image of the plug and socket assembly, are used for training by a variational autocoder (VAE), thereby the images should be encoded and compressed into a 16×1 "representation vector" ensuring that the most of information of the original image is covered.

Embodiments of Steps S130 and S140

The dimensions of the tactile data representation vector and the assembly force data of the robot are descended by causal convolution. The descended data is input to the tensor fusion network model for determining whether the clamping effector reaches an assembly damping point by a multi-layer perceptron including a damping point predictor.

More specifically, for each action step, the tactile flow is descended to a size (i.e., dimension 25×2) by means of a causal convolutional network, and then fused with the representation vector of the two images (i.e., two 16×1 vector) in step S120 by means of a tensor fusion network model (TFN) (i.e., Kronecker's product is performed by adding an element "1" to the end of each modal vector, and the result obtained will contain both the single information and the arbitrary combination of the information of these three modalities), and then the resulting three-dimensional tensor is spread out and inputted into the damper-point predictor including a multi-layer perceptron, which is used for predicting whether or not a plug arrives at the snap damper-point in a socket.

Combining the above embodiments, the plugs and exits extract the tactile data of the 5 action detection points×5 action detection points of the last waypoint in each action step, which are descended using Gaussian convolution (i.e., with a dimension of 9×1), fused with the representation vector of the two images by direct splicing (i.e., with a dimension of 16+16+9), and the resulting representation vector (i.e., with a dimension of 41×1) are reintroduced into the reinforcement learning network and generate the action values for the clamping effector (the five action directions x, y, R, P, Y).

Embodiments of Step S150

In some embodiments, the torque of the 6 movable joints of the robot as shown in F. 4 is solved by the following Jacobi matrix:

$$\tau_q = K_p J^{-1}\bar{S}J\Delta q + K_v J^{-1}\bar{S}\Delta\dot{q} + J^T\left(K_{Fp}S\Delta F + K_{Fi}S\int_0^t \Delta F dt + F_d\right)$$

Wherein, $K_p$, $K_v$, $K_{Fp}$ and $K_{Pi}$ are the control parameters for proportional differentiation (PD) and proportional integration (PI), respectively. Sis the discriminant matrixS=diagS=diag(1, 1, 0, 1, 1, 1), that is, the bit control dimension corresponds to a value of 1 and the force control dimension corresponds to a value of 0.

The robot controller implements position control by means of a PD control algorithm; the robot controller implements force control by means of a PI control algorithm.

Figure 5:
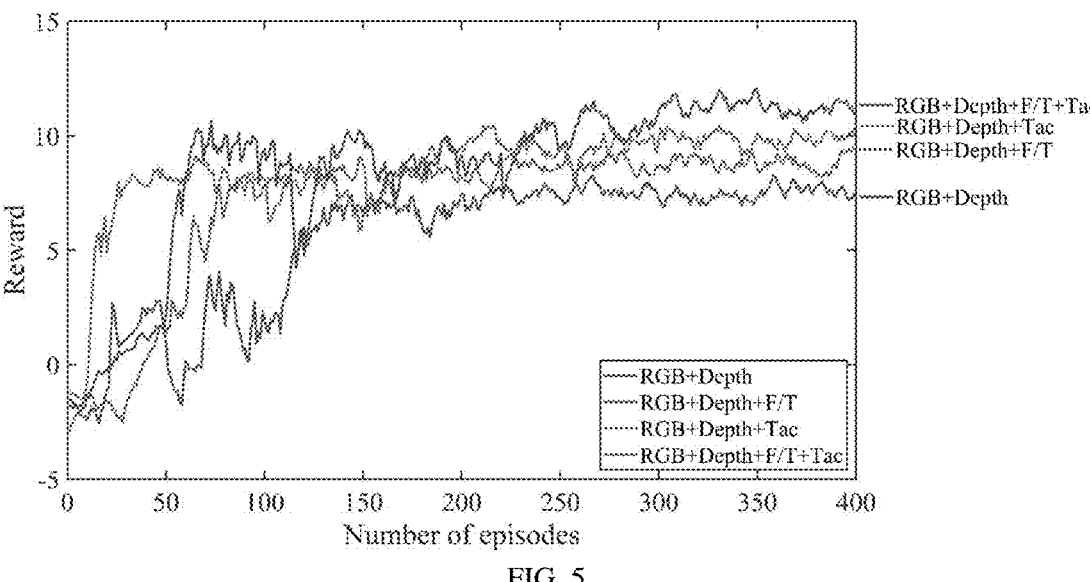
FIGS. 5 and 6 are schematic diagrams with curves showing reinforcement learning results in the method according to the disclosure.
Figure 6:
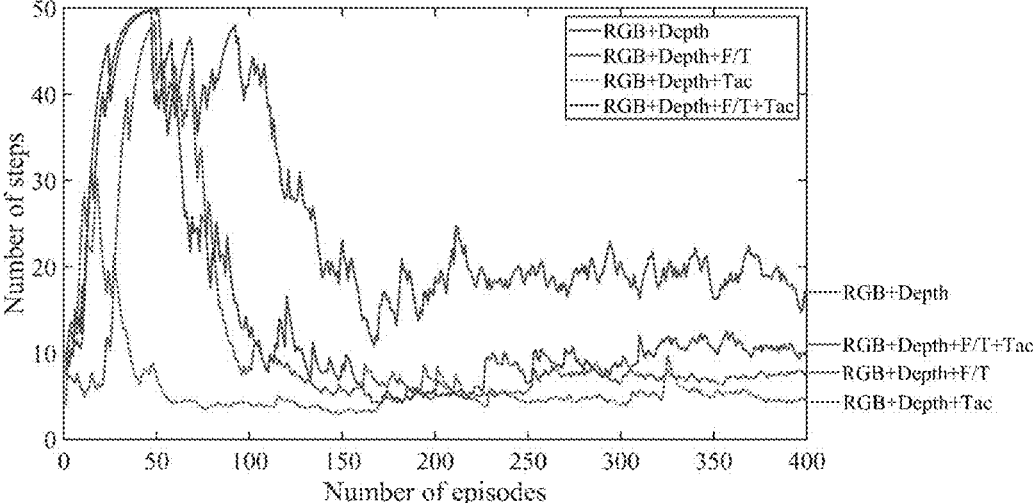

With reference to the schematic diagrams of the curves of the reinforcement learning results according to the method of the disclosure shown in FIGS. 5 and 6, the network model trained using the fusion of the RGB image data+the depth image data+the F/T force sensor data+the robotic torque feedback data is able to obtain more rewards (i.e., it is the successful completion of the desired assembly (i.e., more successful completion of the desired assembly effect) and fewer action steps in the assembly operation. That is, the assembly method implemented by the fusion of visual, tactile and reinforcement learning network models achieves better robot precision assembly results.

Referring to FIG. 7, in other embodiments, a neural network of a multilayer perceptron can be introduced into the computer program of the assembly control system, and a neural network of a multilayer perceptron can be obtained by splicing and fusing the reference visual data representation vector, the initial tactile data representation vector, the actual tactile data representation vector, the initial posture data representation vector, and the actual posture data representation vector and inputting them into the multilayer perceptron for training to finally obtain a multilayer perceptron that can predict actual Finally, a multilayer perceptron that can predict the actual image representation vector is obtained, and the camera is no longer needed to acquire image data. The predicted visual representation vector output from the multilayer perceptron replaces the existing data acquired from the actual image by the vision device, so that the system can still complete the precision assembly steps when the vision device is blocked by the clamping effector or when the vision device is defocused, etc., and the reliability of the system can be increased.

Referring to FIG. 7, the assembly control method based on the robot for a predicted assembly scenario can include the following steps of:

S210, providing a plurality of neural network models including a multilayer perceptron, a reinforcement learning network model and a tensor fusion network model, wherein the training data for the models includes visual data from the vision device, tactile data from the tactile sensor, position and orientation data from a robot controller, motion feedback data from the robot and torque feedback data from the robot;

S220, driving the clamping effector by the robot controller to launch an assembly action from an initial point of assembly, and acquiring reference visual data, actual visual data, initial tactile data and actual tactile data corresponding to the assembly area in real time by means of the vision device and the tactile sensor, providing initial position and orientation data and the actual position and orientation data by the robot controller, compressing the data and/or processing the data by a filter, and converting the data to reference visual data representation vector, actual visual representation vector, actual tactile data representation vector, initial tactile data representation vector and actual position and orientation data representation vector, respectively;

S230, splicing and fusing the reference visual data representation vector (z_ref), the initial tactile data representation vector (tac_ref), the actual tactile data representation vector (tac_real), the initial position and orientation data representation vector (pos_ref) and the actual position and orientation data representation vector (pos_real), and inputting the vectors to the multilayer perceptron for output a predicted visual representation vector (z_real) that is close to an actual visual representation vector;

S240, splicing and fusing the predicted visual representation vector and the actual tactile data representation vector, and inputting the vectors to the reinforcement learning network model for outputting predicted motion control data of the robot;

S250, descending dimensions of the tactile data representation vector and assembly force data of the robot by causal convolution, inputting the descended tactile data representation vector, the descended assembly force data and the predicted visual representation vector to the tensor fusion network model, and determining whether the clamping effector reaches an assembly damping point by a multi-layer perceptron including a damping point predictor;

S260, implementing a position control and a force control by the robot controller according to the prediction of whether or not the clamping effector reaches the assembly damping point, to calculate the position and orientation data of the next assembly motion point and to adjust an assembly force of the clamping effector.

The step S210 further specifically includes: inputting a plurality sets of the RGB image data and tactile data acquired in the assembly area to the reinforcement learning network model for training (as shown in FIG. 7). In the embodiment, the real-time Cartesian space position and orientation of the clamping effector at the end of the robot is read and input to the reinforcement learning network model for training, meanwhile, the RGB image data and the tactile information in the area where the plug and socket are located are acquired. If the clamping effector is closer to the assembly damping point, or if the depth of insertion of the clamping effector into the assembly damping point is deeper, a reward in the reward function of the reinforcement learning network model increases accordingly. The reward of the reward function of the reinforcement learning network model in the embodiment is increased according to the proximity of the plug to the socket and the depth of insertion of the plug into the socket. In the reinforcement learning of the plug-jack task, RGB image data and tactile data of the assembly area are acquired, and the acquired image data is input to a variational auto encoder for training. In addition, the training the reinforcement learning network model in combination with the robot platform includes the steps referring to the steps S111 to S115 in the method described above.

For the step S220, reference can likewise be made to the step S120 and its sub-steps in the method described above.

For the step S230, the reference visual data is descended by an image encoder to a reference visual data representation vector with a dimension of 16×1; reference image data is generated from the reference visual data representation vector by an image decoder; and a loss function is provided based on a mean square error (MSE) of the comparison between the reference image data and pixel points of the original inputting image, for training the image encoder and the image decoder by means of inverse transferring and parameter updating. The new image acquired again by the vision device is converted to the representation vector by the trained image encoder.

Wherein, the initial position and orientation data representation vector (pos_ref), the reference visual data representation vector (z_ref), and the initial tactile data representation vector (tac_ref) are a set of data acquired separately in step S20. These three data informations are feedbacks from different perspectives for the same object in the same state. The vision device acquires a reference image for obtaining a reference visual data representation vector (z_ref) by an image encoder; and the vision device acquires an actual real image for obtaining a predicted visual representation vector (z_real) by an image encoder. Specifically, the reference visual data representation vector (z_ref), the initial tactile data representation vector (tac_ref), the actual tactile data representation vector (tac_real), the initial position and orientation data representation vector (pos_ref), and the actual position and orientation data representation vector (pos_real) are spliced and fused to a vector to input to a multilayer perceptron, so that the multilayer perceptron outputs a dimension of a predicted visual representation vector (z_real) for comparing with the predicted visual representation vector (z_real) of the actual real image. The loss function is obtained based on a mean square error of the comparison for training the perceptron by means of inverse transferring and parameter updating Finally, the trained multilayer perceptron can predict the representation vector of the actual image and the camera is no longer needed to acquire image data subsequently, so that the predicted visual representation vector (z_real) of the actual real image is replaced by the predicted visual representation vector (z_real) from the five representation vectors (tac_ref, pos_ref, z_ref, tac_real and pos_real).

For the step S240, the predicted visual representation vector output from the multilayer perceptron replaces the existing data acquired from the actual image from the vision device, so that the system can still complete the precision assembly steps if the vision device is blocked by the clamping effector or if the vision device is defocused, etc., and therefore the reliability of the system can be increased. For the step S250, reference can also be made to the step S150 and its sub-steps in the above method.

It should be recognized that embodiments of the present invention can be implemented or embodied via computer hardware, a combination of both hardware and software, or by computer instructions stored in a non-transitory computer-readable memory. The methods can be implemented in computer programs using standard programming techniques-including a non-transitory computer-readable storage medium configured with a computer program, where the storage medium so configured causes a computer to operate in a specific and predefined manner-according to the methods and figures described in this Specification. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits programmed for that purpose.

In addition, operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program including a plurality of instructions executable by one or more processors.

Further, methodologies may be implemented in any type of computing platform that is operatively connected to a suitable tomography data scanning device, including but not limited to, personal computers, mini-computers, mainframes, workstations, networked or distributed computing environments, computer platforms separate, integral to, or in communication with charged particle tools or other imaging devices, and the like. Aspects of the present invention may be implemented in machine readable code stored on a non-transitory storage medium or device, whether removable or integral to the computing platform, such as a hard disc, optical read and/or write storage mediums, RAM, ROM, and the like, so that it is readable by a programmable computer, for configuring and operating the computer when the storage media or device is read by the computer to perform the procedures described herein. Moreover, machine-readable code, or portions thereof, may be transmitted over a wired or wireless network. The invention described herein includes these and other various types of non-transitory computer-readable storage media when such media contain instructions or programs for implementing the steps described above in conjunction with a microprocessor or other data processor. The invention also includes the computer itself when programmed according to the methods and techniques described herein.

Computer programs can be applied to input data to perform the functions described herein and thereby transform the input data to generate output data stored to nonvolatile memory. The output information may also be applied to one or more output devices such as a display monitor. In preferred embodiments of the present disclosure, the transformed data represents physical and tangible objects, including producing a particular visual depiction of the physical and tangible objects on a display.

The above description is only a preferred embodiment of the disclosure. The disclosure is not limited to the above embodiments. As long as the same means can achieve the technical effects of the disclosure, any modifications, equivalent substitutions, improvements, etc., made within the spirit and principles disclosed herein should be included within the scope of the disclosure. Various modifications and variations can be made to the technical solution and/or implementation method within the scope of the disclosure.

The invention claimed is:

1. An assembly control method based on a robot for a cross-modal predicted assembly scenario, wherein a tactile sensor is provided on a clamping effector at an end of the robot, wherein an assembly area of the clamping effector is photographed by a vision device, and wherein the method comprises the following steps of:

S210, providing a plurality of neural network models comprising a multilayer perceptron, a reinforcement learning network model and a tensor fusion network model, wherein the training data for the models comprises visual data from the vision device, tactile data from the tactile sensor, position and orientation data from a robot controller, motion feedback data from the robot and torque feedback data from the robot;

S220, driving the clamping effector by the robot controller to launch an assembly action from an initial point of assembly, and acquiring reference visual data, actual visual data, initial tactile data and actual tactile data corresponding to the assembly area in real time by means of the vision device and the tactile sensor, providing initial position and orientation data and the actual position and orientation data by the robot controller, compressing the data and/or processing the data by a filter, and converting the data to reference visual data representation vector, actual visual representation vector, actual tactile data representation vector, initial tactile data representation vector and actual position and orientation data representation vector, respectively;

S230, splicing and fusing the reference visual data representation vector, the initial tactile data representation vector, the actual tactile data representation vector, the initial position and orientation data representation vector and the actual position and orientation data representation vector, and inputting the vectors to the multilayer perceptron for output a predicted visual representation vector that is close to an actual visual representation vector;

S240, splicing and fusing the predicted visual representation vector and the actual tactile data representation vector, and inputting the vectors to the reinforcement learning network model for outputting predicted motion control data of the robot;

S250, descending dimensions of the tactile data representation vector and assembly force data of the robot by causal convolution, inputting the descended tactile data representation vector, the descended assembly force data and the predicted visual representation vector to the tensor fusion network model, and determining whether the clamping effector reaches an assembly damping point by a multi-layer perceptron comprising a damping point predictor; and S260, implementing a position control and a force control by the robot controller according to the prediction of whether or not the clamping effector reaches the assembly damping point, to calculate the position and orientation data of the next assembly motion point and to adjust an assembly force of the clamping effector.

2. The method according to claim 1, wherein the step S220 comprises the following step of:

S221, generating a tactile flow data of the robot along the direction of the assembly action from the tactile data filtered by a Kalman filter, by means of an optical flow algorithm.

3. The method according to claim 2, wherein the step S221 further comprises:

processing the tactile flow data to a processed tactile data with a tactile detection point dimension of $9\times1$ by means of Gaussian convolution dimension reduction.

4. The method according to claim 1, wherein the visual data comprises RGB image data, and wherein
the step S220 further comprises the following steps of:
S222, clipping and converting the acquired RGB image data with 128 pixels×128 pixels to a grayscale image, and compressing the grayscale image converted from corresponding RGB image data to an RGB representation vector by an RGB image encoder, wherein the corresponding RGB image data is related to the last waypoint in each assembly action step of the clamping effector; and
S223, providing a variational auto encoder, and inputting the processed grayscale image to the variational auto encoder for training multiple times, and outputting an RGB representation vector with a dimension of $16\times1$ finally.

5. The method according to claim 1, wherein the step S230 comprises the following step of:
S231, descending the reference visual data by an image encoder to a reference visual data representation vector with a dimension of $16\times1$, generating reference image data from the reference visual data representation vector by an image decoder, and providing a loss function based on a mean square error of the comparison between the reference image data and pixel points of the original inputting image, for training the image encoder and image decoder by means of inverse transferring and parameter updating.

* * * * *